(12) United States Patent
Lim et al.

(10) Patent No.: US 11,106,576 B2
(45) Date of Patent: Aug. 31, 2021

(54) DATA STORAGE DEVICE FOR MANAGING MEMORY RESOURCES BY USING FLASH TRANSLATION LAYER WITH CONDENSED MAPPING INFORMATION

(71) Applicant: Samsung Electronics Co., Ltd., Suwon-si (KR)

(72) Inventors: Sangwoo Lim, Yongin-si (KR); Dongkun Shin, Seoul (KR)

(73) Assignees: Samsung Electronics Co., Ltd., Gyeonggi-do (KR); Research & Business Foundation SungKyunKwan University, Gyeonggi-do (KR)

( * ) Notice: Subject to any disclaimer, the term of this patent is extended or adjusted under 35 U.S.C. 154(b) by 20 days.

(21) Appl. No.: 16/781,510

(22) Filed: Feb. 4, 2020

(65) Prior Publication Data

US 2020/0401510 A1 Dec. 24, 2020

(30) Foreign Application Priority Data

Jun. 20, 2019 (KR) .................. 10-2019-0073753

(51) Int. Cl.
*G06F 12/02* (2006.01)
*G06F 11/34* (2006.01)
(Continued)

(52) U.S. Cl.
CPC ...... *G06F 12/0246* (2013.01); *G06F 11/3037* (2013.01); *G06F 11/3471* (2013.01);
(Continued)

(58) Field of Classification Search
None
See application file for complete search history.

(56) References Cited

U.S. PATENT DOCUMENTS 7,679,133 B2   3/2010  Son et al.
8,553,466 B2  10/2013  Han et al.
(Continued)

OTHER PUBLICATIONS

Bhimani et al. "Enhancing SSDs with Multi-Stream: What? Why? How?" Dec. 2017. IEEE. IPCCC 2017.*
(Continued)

*Primary Examiner* — Nathan Sadler
(74) *Attorney, Agent, or Firm* — Harness, Dickey & Pierce, P.L.C.

(57) ABSTRACT

There is provided a data storage device for managing memory resources by using a flash translation layer (FTL) for condensing mapping information. The FTL divides a total logical address space for input and output requests of a host into n virtual logical address streams, generates a preliminary cluster mapping table in accordance with stream attributes of the n virtual logical address streams, generates a condensed cluster mapping table by performing a k-mean clustering algorithm on the preliminary cluster mapping table, and generates a cache cluster mapping table configured as a part of a condensed cluster mapping table frequently referred to by using a DFTL method. The FTL extends a space of data buffers allotted to non-mapped physical address streams to a DFTL cache map in a data buffer of a volatile memory device by the condensed cluster mapping table.

20 Claims, 17 Drawing Sheets

(51) Int. Cl.
*G06K 9/62* (2006.01)
*G06F 12/0873* (2016.01)
*G06F 12/123* (2016.01)
*G06F 13/16* (2006.01)
*G06F 11/30* (2006.01)

(52) U.S. Cl.
CPC ...... *G06F 12/0292* (2013.01); *G06F 12/0873* (2013.01); *G06F 12/123* (2013.01); *G06F 13/1668* (2013.01); *G06K 9/6223* (2013.01); *G06F 2212/7201* (2013.01)

(56) References Cited

U.S. PATENT DOCUMENTS

| | | | |
|---|---|---|---|
| 8,559,235 | B2 | 10/2013 | Yoon et al. |
| 8,654,587 | B2 | 2/2014 | Yoon et al. |
| 9,164,676 | B2 | 10/2015 | Craft et al. |
| 9,898,202 | B2 | 2/2018 | Martineau et al. |
| 9,959,046 | B2 | 5/2018 | Huo et al. |
| 10,101,947 | B2 | 10/2018 | Hong et al. |
| 10,198,215 | B2 | 2/2019 | Lazo et al. |
| 2011/0233648 | A1 | 9/2011 | Seol et al. |
| 2016/0283124 | A1 | 9/2016 | Hashimoto et al. |
| 2017/0075832 | A1* | 3/2017 | Bhimani ............... G06F 3/0688 |
| 2017/0228157 | A1 | 8/2017 | Yang et al. |
| 2017/0228188 | A1 | 8/2017 | Hassani et al. |
| 2018/0129453 | A1 | 5/2018 | Kim |
| 2018/0150238 | A1 | 5/2018 | Matsuyama et al. |
| 2018/0335947 | A1* | 11/2018 | Martineau ........... G06F 12/0246 |
| 2019/0129617 | A1 | 5/2019 | Huen et al. |
| 2020/0034076 | A1* | 1/2020 | Zentz .................... G06F 3/0604 |

OTHER PUBLICATIONS

Yang et al. "WARCIP:Write Amplification Reduction by Clustering I/O Pages. " Jun. 2019. ACM. SYSTOR '19. pp. 155-166.*
Lim et al. "DStream: Dynamic Memory Resizing for Multi-Streamed SSDs." Jun. 2019. IEEE. ITC-CSCC 2019.*
Yang et al. "Reducing Garbage Collection Overhead in SSD Based on Workload Prediction." Jul. 2019. USENIX. HotStorage '19.*
Kang, Jeong-Uk et al., "The multi-streamed solid-state drive." 6th {USENIX} Workshop on Hot Topics in Storage and File Systems (HotStorage 14) 2014.
Yong, Hwanjin et al., "vStream: virtual stream management for multi-streamed SSDs." 10th {USENIX} Workshop on Hot Topics in Storage and File Systems (HotStorage 18) 2018.
Kim, Taejin et al., "PCStream: automatic stream allocation using program contexts." 10th {USENIX} Workshop on Hot Topics in Storage and File Systems (HotStorage 18) 2018.
Rho, Eunhee et al., "FStream: managing flash streams in the file system." 16th {USENIX} Conference on File and Storage Technologies ({FAST} 18) 2018.
Bhatia, Sanjiv K, "Adaptive K-Means Clustering." FLAIRS conference, 2004.
Yang, Jingpei et al., 'AutoStream: Automatic Stream Management for Multi-streamed SSDs' *ACM*—Proceedings of the 10th ACM International Systems and Storage Conference, 2017.

* cited by examiner

DATA STORAGE DEVICE FOR MANAGING MEMORY RESOURCES BY USING FLASH TRANSLATION LAYER WITH CONDENSED MAPPING INFORMATION

CROSS-REFERENCE TO RELATED APPLICATION

This application claims the benefit of Korean Patent Application No. 10-2019-0073753, filed on Jun. 20, 2019, in the Korean Intellectual Property Office, the disclosure of which is incorporated herein in its entirety by reference.

BACKGROUND

A data storage device for managing flash memory resources by using a flash translation layer (FTL) with condensed mapping information and a method of operating the same.

In order for a data storage based on flash memory to perform a request from an operating system (OS) or a file system to access the data storage device an FTL exists between the systems and the flash memory. The flash memory uses read and write operations in units of pages and erase operations in units of blocks as basic operations but has a limited lifespan. In order to overcome the limitations of the flash memory in which data may not be overwritten in the right place the FTL includes mapping information that defines a relationship between a logical address provided by a host and a physical address of the flash memory. The FTL performs an operation of translating the logical address of the host into the physical address of the flash memory by using the mapping information.

The data storage device includes volatile memory, for example, dynamic random access memory (DRAM) or static random access memory (SRAM). The volatile memory performs a data buffer function of storing data requested by the host to be written, writing the stored data in the flash memory, and a mapping function of storing the mapping information of the FTL.

However, a high write amplification may deteriorate the write performance of the data storage device by increasing the likelihood of random writes and increasing the wear-out of the memory cells.

On the other hand, when the memory cells are capable of executing the multi-stream, adaptively controlling the streams of write operations related to each other, and arranging the controlled streams, more flexibility may be secured, write amplification may be reduced, and performance of the device may be improved.

The FTL may store the data requested by a host to be written in the volatile memory and may respond to the host that the data is completely written. After, when a host read request reaches for the same logical address space as the data requested to be written in a state in which the data in the volatile memory is not written in the flash memory, the FTL may process the host read request using the recent data kept in a cache of the volatile memory.

FTL cache function is scalable by efficiently managing the volatile memory, and may improve the performance of the data storage device by increasing the response speed of the memory to a request.

SUMMARY

A data storage device for managing memory resources by using a flash translation layer (FTL) with condensed mapping information and a method of operating the same.

An FTL according to an example embodiment manages mapping information between logical address streams of a host and physical address streams of non-volatile memory devices (NVMs). The FTL includes a stream clustering manager module configured to generate a preliminary cluster mapping table by dividing a total logical address space for input and output requests received from the host into n spaces (n is an integer), setting the n spaces as n virtual logical address streams, and mapping the n virtual logical address streams to k physical address streams (k is a number less than n) in accordance with selected stream attributes of the n virtual logical address streams and an adaptive k-mean clustering algorithm module configured to generate a condensed cluster mapping table for mapping the n virtual logical address streams to c (c is a number less than k) physical address streams by performing an adaptive k-mean clustering algorithm on the preliminary cluster mapping table.

According to an aspect of the inventive concept, there is provided a data storage device including NVMs, a volatile memory device, and a controller configured to control the NVMs and the volatile memory device in response to input and output requests received from the host by using an FTL for managing mapping information between logical address streams of a host and physical address streams of the NVMs. The FTL is configured to generate a preliminary cluster mapping table by dividing a total logical address space for input and output requests received from the host into n (n is an integer), setting the n spaces as n virtual logical address streams, and mapping the n virtual logical address streams to k (k is a number less than n) physical address streams and to generate a condensed cluster mapping table for mapping the n virtual logical address streams to c (c is a number less than k) physical address streams by performing an adaptive k-mean clustering algorithm on the preliminary cluster mapping table.

According to an aspect of the inventive concept, there is provided a method of operating a data storage device including non-volatile memory devices (NVMs), a volatile memory device, and a controller and configured so that the controller controls the NVMs and the volatile memory device in response to input and output requests received from the host. The method includes the controller dividing a total logical address space for the input and output requests of the host into n (n is an integer) and setting the n spaces as n virtual logical address streams, the controller generating a preliminary cluster mapping table configured to map the n virtual logical address streams to k (k is a number less than n) physical address streams, the controller generating a condensed cluster mapping table configured to map the n virtual logical address streams to c (c is a number less than k) physical address streams by performing a k-mean clustering algorithm on the preliminary cluster mapping table, and the controller generating a cache cluster mapping table configured as a part of a mapping table frequently referred to by the condensed cluster mapping table by using a demand-based FTL (DFTL) method for the condensed cluster mapping table.

DETAILED DESCRIPTION OF THE EMBODIMENTS

Figure 1:
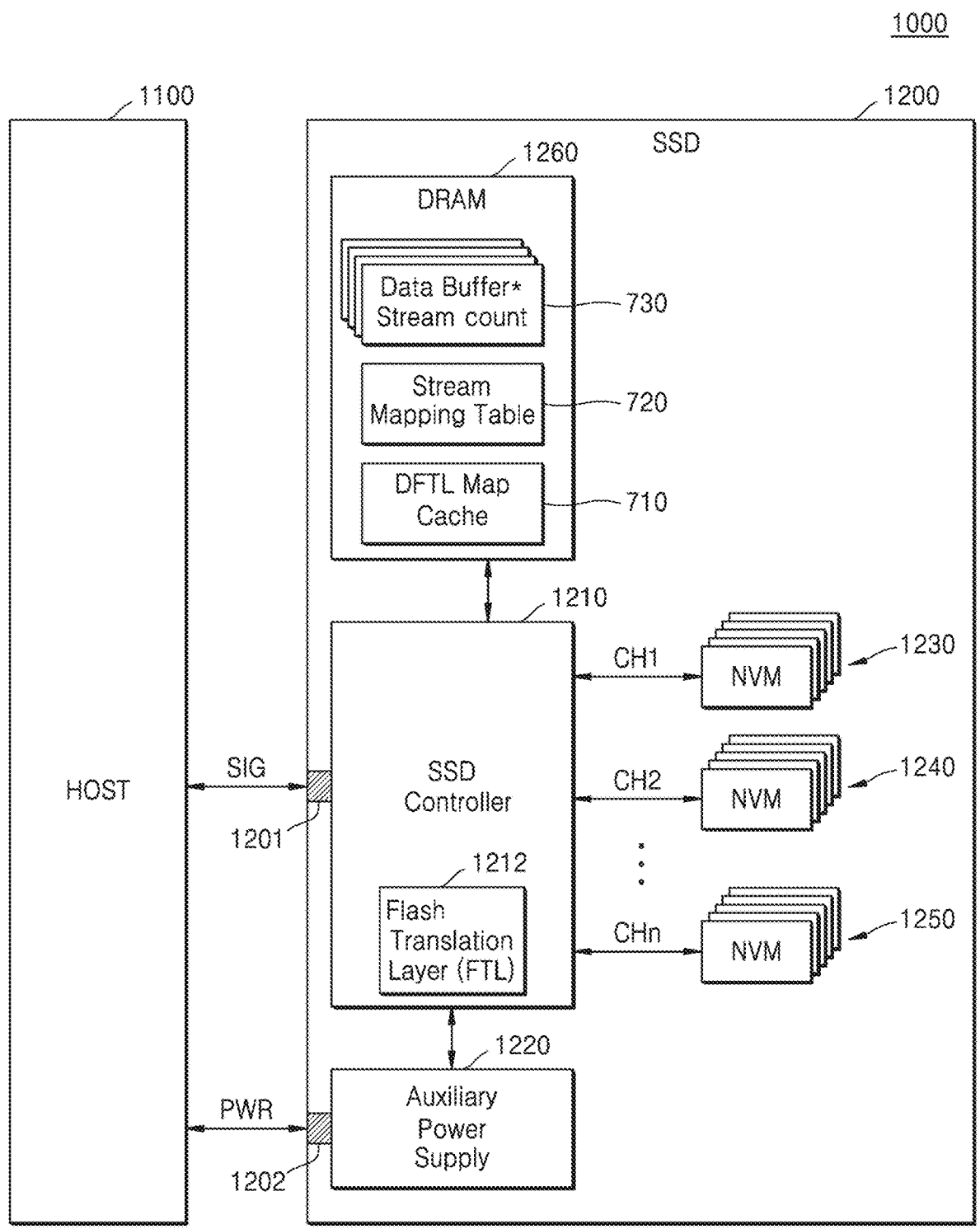
FIG. 1 is a diagram conceptually illustrating a system including a data storage device according to an example embodiment.

FIG. 1 is a diagram conceptually illustrating a system 1000 including a data storage device according to an example embodiment.

Referring to FIG. 1, the system 1000 includes a host 1100 and a data storage device 1200. The data storage device 1200 is comprises a solid state drive (SSD) and the system 1000 may be an SSD system. Hereinafter, the data storage device 1200 is referred to as an SSD 1200.

The SSD 1200 may support a multi-stream. The multi-stream may have the SSD 1200 efficiently arrange data in accordance with similar characteristics or attributes in order to reduce write amplifications and to improve the performance of the SSD 1200. The write amplification depicts the ratio between the number of writes committed to a non-volatile memory device (NVM) and the number of write commands from the host 1100. A high write amplification may deteriorate the write performance of the system 1000 by increasing the likelihood of random writes to the SSD 1200 and may increase the wear-out of non-volatile memory cells. Thus, a high write amplification may deteriorate the lifetime of the SSD 1200.

The host 1100 may clearly open individual data storage units in the SSD 1200 and may provide applications and operating systems each having an interface for separately storing data with different attributes. Such individual data storage units are referred to as "streams." The streams may be used for representing whether different data writes are related to each other or have similar life times. A group of individual data writes may be a part of multi-streams and each stream may be identified by a stream ID allotted by an operating system or a corresponding application. A unique stream ID may be allotted to a stream ID with data having similar characteristics or attributes and accordingly, the data corresponding to the stream ID may be written in the same block in the SSD 1200.

Arrangement of the streams for the multi-stream executed by the host 1100 may be provided by modifying an application or managing the log of previously used data in a table or queues. However, this is inefficient due to the high maintenance and the management overhead.

On the other hand, when the SSD 1200 is capable of executing the multi-stream, adaptively controlling the streams of write operations related to each other, and arranging the controlled streams to be physically recorded in a NAND flash block, more flexibility may be secured, write amplification may be reduced, and performance of the SSD 1200 may be improved.

The SSD 1200 may transmit and receive a signal SIG to and from the host 1100 through a signal connector 1201, and may receive power PWR through a power connector 1202. The SSD 1200 may include an SSD controller 1210, an auxiliary power supply 1220, a plurality of non-volatile memory devices (NVMs) 1230 to 1250, and a volatile memory device 1260.

The SSD controller 1210 may control the plurality of NVMs 1230 to 1250 in response to the signal SIG received from the host 1100. The signal SIG may be a command CMD, an address ADDR, or data DATA. The SSD controller 1210 may write data in the plurality of NVMs 1230 to 1250 or read data from the plurality of NVMs 1230 to 1250 in accordance with the command of the host 1100.

The SSD controller 1210 may manage and/or control read and write operations of the plurality of NVMs 1230 to 1250. In an NVM, a page is a unit of read and write operations and a block is a unit of an erase operation. Since the NVM does not support an overwrite operation, in order to modify data recorded in the page, a process of copying all valid data in a block to another empty block and erasing the previous block is required. Since such a process accompanies a plurality of page copying (page read and write) and erase operations, performance of the NVM may deteriorate.

The SSD controller 1210 may include an FTL 1212 for managing the read and write operations of the NVM. The FTL 1212 may have an address mapping function and a garbage collection function. In the address mapping function, when overwrite is requested by the host 1100, instead of overwriting data in an original page, the corresponding data is recorded in another empty page and accordingly, additional page copy and erase operations may be reduced. For this purpose, in the address mapping function, a mapping table is to be maintained in the volatile memory device 1260 and a logical address received from the host 1100 may be mapped to a physical address of the NVM through the mapping table. In the address mapping function, unnecessary read, write, and erase operations in accordance to overwrite are reduced. However, a plurality of pages (invalidated pages) in which data older than newest data is stored may be generated. In order to prevent a storage space of the NVM from being wasted due to the invalidated pages, the FTL 1212 has to periodically delete invalidated pages, which is referred to as the garbage collection function.

The FTL 1212 may implement an address space that may be updated in a rightful place by using NAND flash blocks in a virtual physical address space for host data or meta data managed by the mapping table that represents the mapping information of the host data and the FTL 1212.

The FTL 1212 has to generate or update the mapping information for translating the logical addresses of the host data into physical addresses of the plurality of NVMs 1230 to 1250 in the mapping table when the host data is written in the plurality of NVMs 1230 to 1250. In addition, the FTL 1212 has to generate or update a bitmap that represents validity information of a page invalidated by the corresponding write operation in the mapping table. The FTL 1212 may include processing circuitry such as hardware including logic circuits; a hardware/software combination such as a processor executing software; or a combination thereof, which performs address translation by using the mapping table in order to process read and write commands transmitted by the host 1100. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), an electronic circuit, Programmable System-on-Chip (PSoC), a combinational logic circuit, etc.

The auxiliary power supply 1220 may be connected to the host 1100 through the power connector 1202. The auxiliary power supply 1220 may receive the power PWR from the host 1100 and may supply the received power PWR to the SSD controller 1210. The auxiliary power supply 1220 may be located in or outside the SSD 1200. For example, the auxiliary power supply 1220 is located in a main board of the system 1000 and may provide auxiliary power to the SSD 1200.

The plurality of NVMs 1230 to 1250 may be used as a storage of the SSD 1200. Each of the plurality of NVMs 1230 to 1250 may include a flash memory device. The plurality of NVMs 1230 to 1250 may be connected to the SSD controller 1210 through a plurality of channels CH1 to CHn. A plurality of NVMs may be connected to one channel and the number of NVMs connected to one channel may be defined as a way or a bank.

The volatile memory device 1260 may operate as an input and output buffer for the SSD controller 1210. The volatile memory device 1260 may include a demand-based FTL (DFTL) map cache 710, a stream mapping table 720, and a data buffer 730. The volatile memory device 1260 may be implemented by dynamic random access memory (DRAM) or static random access memory (SRAM).

In a write mode, the SSD controller 1210 may store the host data received from the host in the data buffer 730 of the volatile memory device 1260 and the host data stored in the data buffer 730 may be written in the plurality of NVMs 1230 to 1250. According to an embodiment, when a write request is received from the host 1100, the SSD controller 1210 may use the data buffer 730 of the volatile memory device 1260 in order to gather a certain amount of host data based on specifications of the NVMs. For example, the SSD controller 1210 may gather the system 1000 utilizes a 3-bit multi-level cell TLC and a high speed program (HSP) method and adjust accordingly. In addition, in a read mode, the SSD controller 1210 may store read data read from the plurality of NVMs 1230 to 1250 in the data buffer 730 of the volatile memory device 1260 and may provide the read data stored in the data buffer 730 to the host 1100.

The SSD controller 1210 may control the plurality of NVMs 1230 to 1250 and the volatile memory device 1260 in response to input and output requests received from the host 1100 by using the FTL 1212 to manage the mapping information of the logical addresses of the host data and the physical addresses of the plurality of NVMs 1230 to 1250.

The SSD controller 1210 may divide a total logical address space for the input and output requests of the host 1100 into n spaces and may set n virtual logical address streams, where n is an integer. The SSD controller 1210 may generate a preliminary cluster mapping table P_MAP (FIG. 5) for mapping the n virtual logical address streams to k physical address streams by performing a k-mean clustering algorithm, where k is a number less than n. The SSD controller 1210 may allot k physical address streams to the data buffer 730 of the volatile memory device 1260 based on the preliminary cluster mapping table P_MAP. Therefore, the data buffer 730 of the volatile memory device 1260 may include k data buffers corresponding to the k physical address streams.

The SSD controller 1210 may generate a condensed cluster mapping table C_MAP (FIG. 6) for mapping the n virtual logical address streams to c physical address streams by performing an adaptive k-mean clustering algorithm on the preliminary cluster mapping table P_MAP, where c is a number less than k. The SSD controller 1210 may store the condensed cluster mapping table C_MAP in the stream mapping table 720 of the volatile memory device 1260. Therefore, the data buffer 730 of the volatile memory device 1260 may include c data buffers corresponding to c physical address streams.

The SSD controller 1210 may retain an empty space allotted to k-c non-mapped physical address streams that are not used in the data buffer 730 of the volatile memory device 1260 based on the condensed cluster mapping table C_MAP. The SSD controller 1210 may extend the empty space allotted to the k-c non-mapped physical address streams to the DFTL map cache 710 in the data buffer 730 of the volatile memory device 1260.

Figure 2:
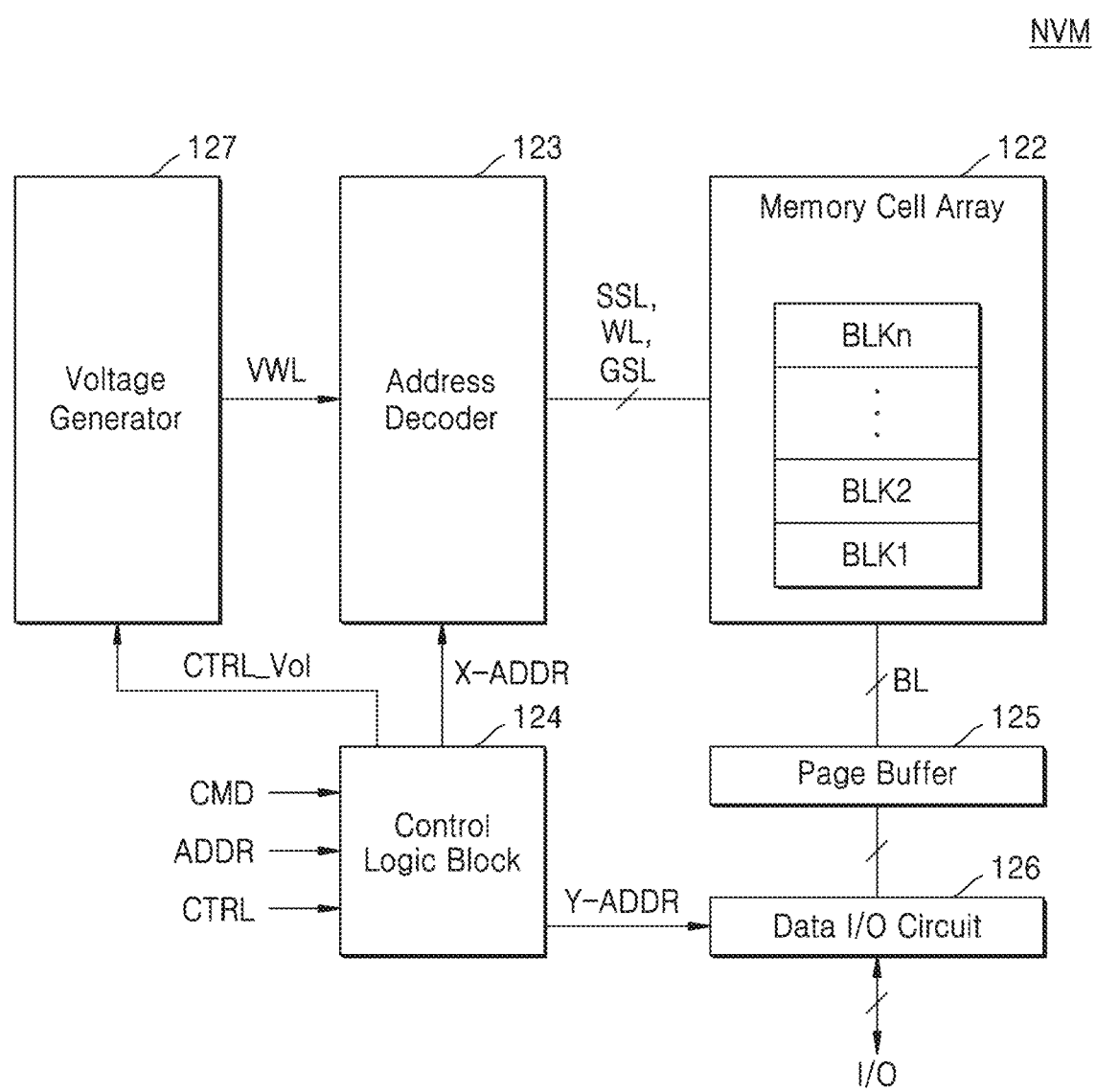
FIG. 2 is a block diagram illustrating an example of a non-volatile memory device included in the solid state drive (SSD) of FIG. 1.

FIG. 2 is a block diagram illustrating an example of an NVM included in the SSD 1200 of FIG. 1.

Referring to FIG. 2, the NVM may include a memory cell array 122, an address decoder 123, a control logic block 124, a page buffer 125, a data input and output circuit 126, and a voltage generator 127.

The memory cell array 122 may be connected to word lines WL, string selection lines SSL, ground selection lines GSL, and bit lines BL. The memory cell array 122 may be connected to the address decoder 123 through the word lines WL, the string selection lines SSL, and the ground selection lines GSL and may be connected to the page buffer 125 through the bit lines BL. The memory cell array 122 may include first to nth memory blocks BLK1 to BLKn.

In an embodiment, the memory cell array 122 may be a three-dimensional memory cell array formed on a substrate in a three-dimensional structure (i.e. a vertical structure). In this case, the memory cell array 122 may include vertical memory cell strings including a plurality of memory cells stacked atop each other. In another embodiment, the memory cell array 122 may be a two-dimensional memory cell array formed on a substrate in a two-dimensional structure (i.e. a horizontal structure).

The three-dimensional memory cell array may be monolithically formed on at least one level of an active region arranged on a silicon substrate and the memory cell arrays may have circuits formed on or in a substrate. The term "monolithic" means that the layers of each level are stacked directly on the lower levels of the array. In an example embodiment, the three-dimensional memory cell array may include NAND strings in which at least one memory cell is arranged in a vertical direction in relation to another memory cell. The vertical memory cell may include a charge trap layer. In the U.S. Pat. No. 7,679,133, the U.S. Pat. No. 8,553,466, the U.S. Pat. No. 8,654,587, the U.S. Pat. No. 8,559,235, and the U.S. Patent Publication No. 2011/0233648, proper configurations of the three-dimensional memory array that is formed of a plurality of levels and in which word lines and/or bit lines are shared among the levels are described in detail.

Each of the first to nth memory blocks BLK1 to BLKn may include a plurality of memory cells and a plurality of selection transistors. The plurality of memory cells may be connected to the word lines WL and the plurality of selection transistors may be connected the string selection lines SSL or the ground selection lines GSL. The plurality of memory cells of the first to nth memory blocks BLK1 to BLKn may be formed of single level cells for storing 1-bit data or multi-level cells for storing M-bit data, where M represents an integer greater than or equal to 2.

The address decoder 123 may select one of the first to nth memory blocks BLK1 to BLKn of the memory cell array 122, may select one of word lines WL of the selected memory block, and may select one of the string selection lines SSL.

The control logic block 124 may output various control signals for performing program, read, and erase operations on the memory cell array 122 based on the command CMD, the address ADDR, and a control signal CTRL. The control logic block 124 may provide a row address X-ADDR to the address decoder 123, may provide a column address Y-ADDR to the data input and output circuit 126, and may provide a voltage control signal CTRL_Vol to the voltage generator 127.

The page buffer 125 may operate as a write driver or a sense amplifier in accordance with an operation mode. During the read operation, the page buffer 125 may sense bit lines BL of the selected memory cell in accordance with control of the control logic block 124. The sensed data may be stored in latches provided in the page buffer 125. The page buffer 125 may dump the data stored in the latches to the data input and output circuit 126 in accordance with the control of the control logic block 124.

The data input and output circuit 126 may temporarily store the command CMD, the address ADDR, the control signal CTRL, and the data DATA that are provided from the outside of the NVM through an input and output line I/O. The data input and output circuit 126 may temporarily store read data of the NVM and may output the stored read data to the outside through the input output line I/O at a designated timing point.

The voltage generator 127 may generate various kinds of voltages for performing the program, read, and erase operations on the memory cell array 122 based on the voltage control signal CTRL_Vol. In detail, the voltage generator 127 may generate a word line voltage VWL, for example, a program voltage, a read voltage, a pass voltage, an erase verification voltage, or a program verification voltage. In addition, the voltage generator 127 may generate a string selection line voltage and a ground selection line voltage based on the voltage control signal CTRL_Vol. In addition, the voltage generator 127 may generate an erase voltage to be applied to the memory blocks BLK1 to BLKn.

Figure 3A:
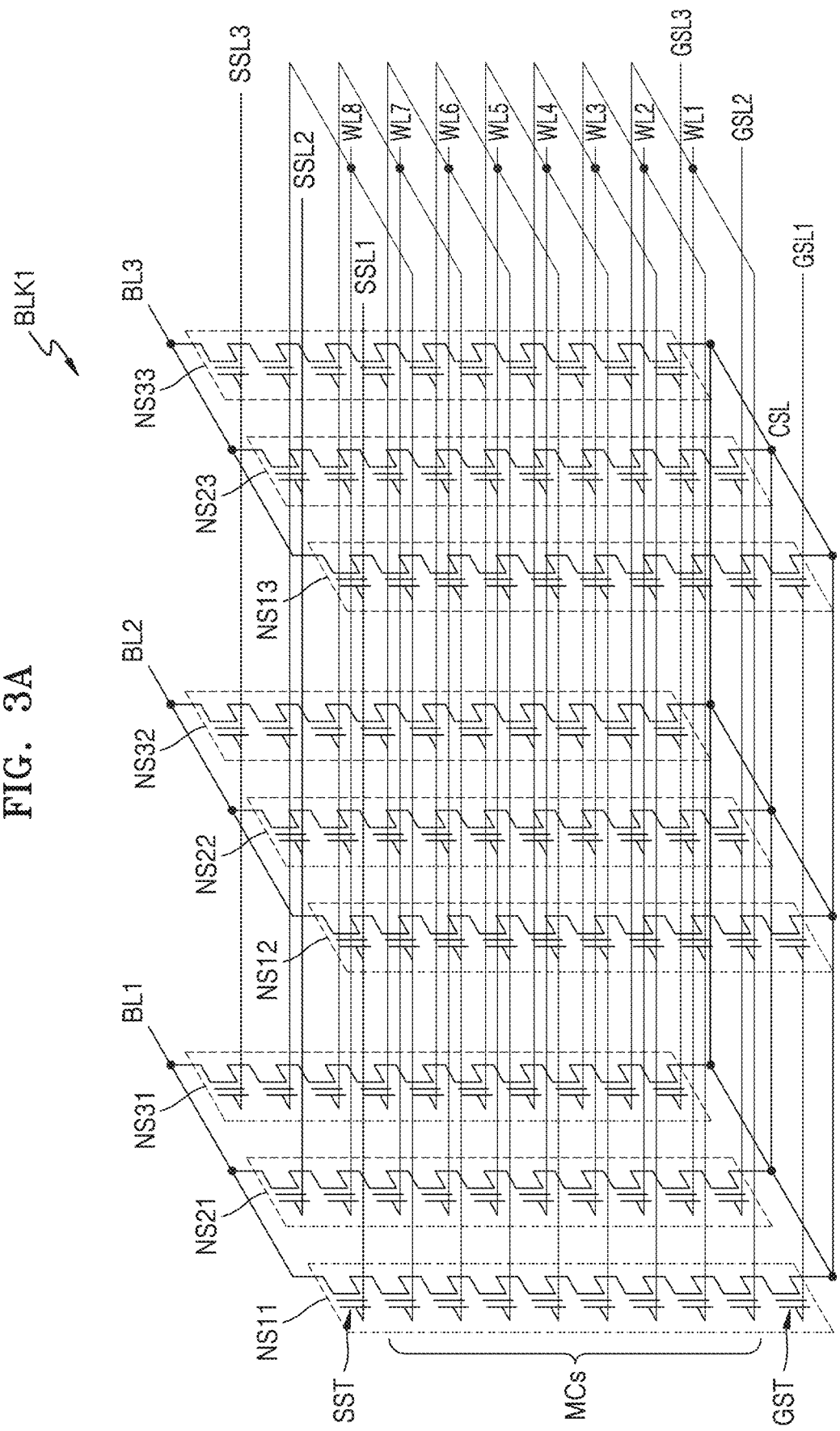
FIGS. 3A to 3C are diagrams illustrating a memory cell array in the non-volatile memory device of FIG. 2.
Figure 3B:
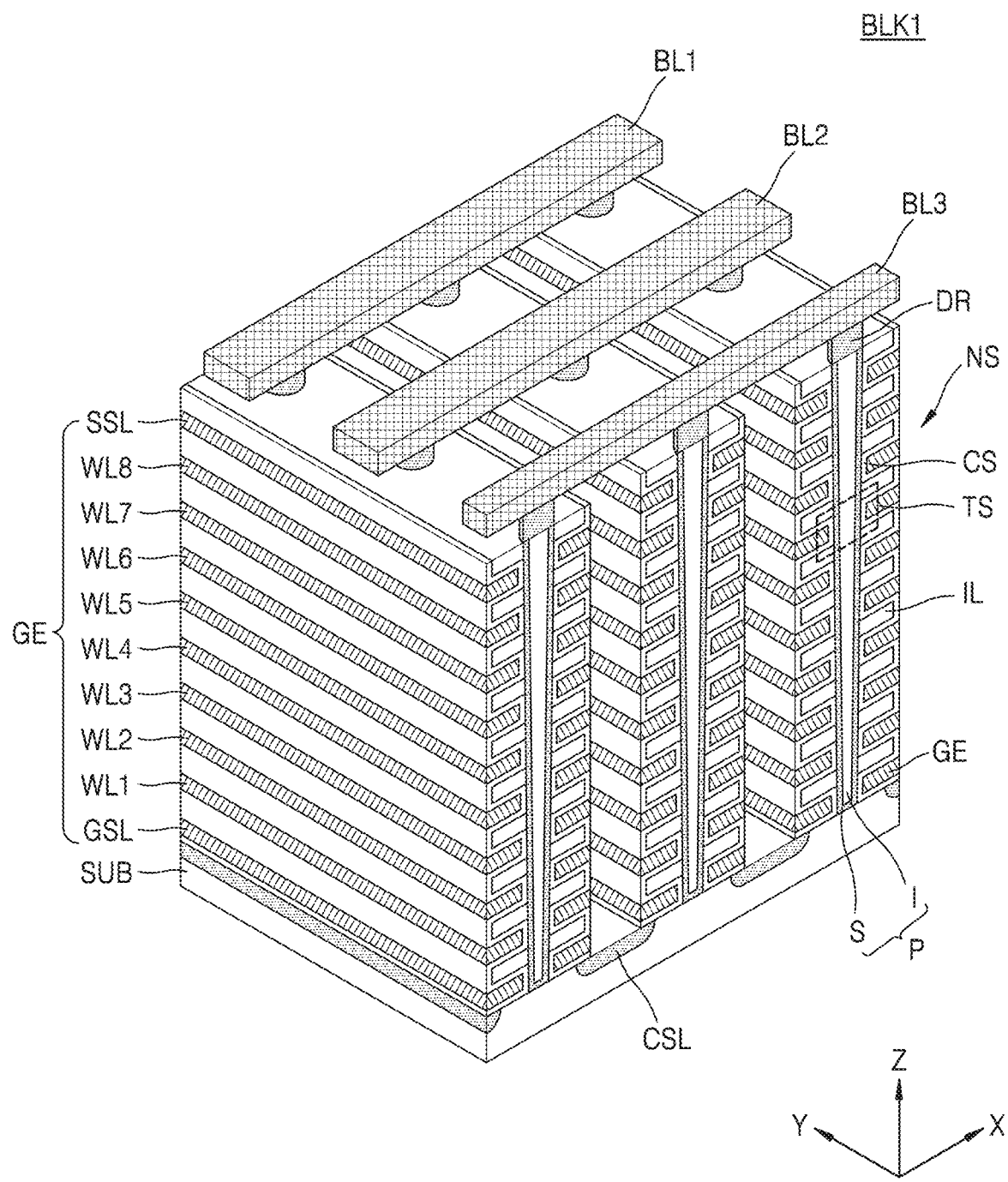
Figure 3C:
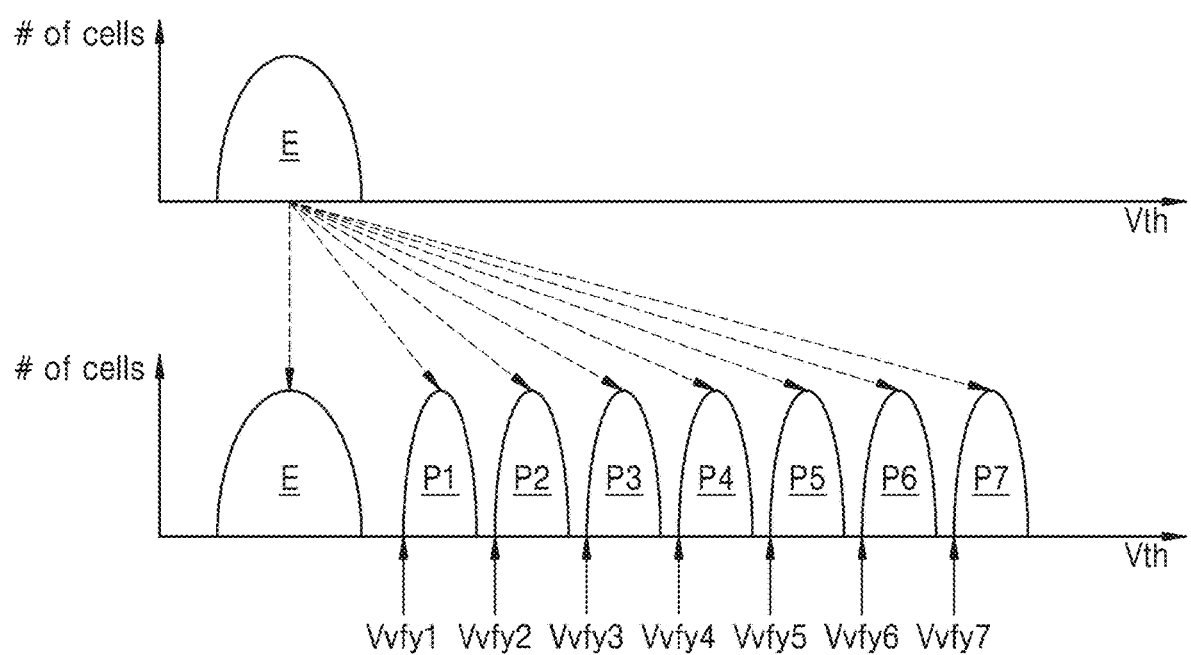

FIGS. 3A to 3C are diagrams illustrating a memory cell array in the non-volatile memory device of FIG. 2. FIGS. 3A and 3B are a circuit diagram and a perspective view of the first memory block BLK1 included in the memory cell array 122 in the NVM of FIG. 2. The memory cell array 122 illustrated in FIGS. 3A and 3B illustrate the three-dimensional memory cell array formed on the substrate in the three-dimensional structure. The memory cell strings or the NAND strings included in the memory cell array 122 may be formed in a direction perpendicular to the substrate.

Referring to FIG. 3A, the first memory block BLK1 may include NAND strings NS11 to NS33, word lines WL1 to WL8, bit lines BL1 to BL3, ground selection lines GSL1 to GSL3, string selection lines SSL1 to SSL3, and a common source line CSL. The NAND strings NS11 to NS33 are connected between the bit lines BL1, BL2, and BL3 and the common source line CSL. Each of the NAND strings NS11 to NS33 may include a string selection transistor SST, a plurality of memory cells MCs, and a ground selection transistor GST that may be serially connected to each other. It is illustrated that each of the NAND strings NS11 to NS33 includes the eight memory cells MCs. However, the example embodiments are not limited thereto.

The string selection transistor SST may be connected to corresponding string selection lines SSL1, SSL2, and SSL3. The plurality of memory cells MCs may be respectively connected to corresponding word lines WL1 to WL8. The ground selection transistor GST may be connected to corresponding ground selection lines GSL1, GSL2, and GSL3. The string selection transistor SST may be connected to corresponding bit lines BL1, BL2, and BL3. The ground selection transistor GST may be connected to the common source line CSL. A word line of the same height (for example, WL1) may be commonly connected and the string selection lines SSL1, SSL2, and SSL3 and the ground selection lines GSL1, GSL2, and GSL3 may be spaced apart from each other.

Among the NAND strings NS11 to NS33, the NAND strings NS11, NS12, and NS13 of a first row may be commonly connected to the string selection line SSL1. The NAND strings NS21, NS22, and NS23 of a second row may be commonly connected to the string selection line SSL2. The NAND strings NS31, NS32, and NS33 of a third row may be commonly connected to the string selection line SSL3. The NAND strings NS11, NS12, and NS13 of the first row may configure a first plane, the NAND strings NS21, NS22, and NS23 of the second row may configure a second plane, and the NAND strings NS31, NS32, and NS33 of the third row may configure a third plane. In the current embodiment, the first memory block BLK1 illustrates the three planes connected to the three bit lines BL1 to BL3.

The number of rows and columns of the NAND strings in the first memory block BLK1 may increase or decrease. As the number of rows of the NAND strings changes, the number of planes may change. As the number of columns of the NAND strings changes, the number of bit lines connected to columns of the NAND strings and the number of NAND strings connected to one string selection line may also change. The heights of the NAND strings may increase or decrease. For example, the number of memory cells respectively stacked on the NAND strings may increase or decrease.

Referring to FIG. 3B, the first memory block BLK1 may be perpendicular to a substrate SUB. The substrate SUB is provided with a common source line CSL having a first conduction type (i.e. p-type), extending on the substrate SUB in a first direction y, and doped with second conduction type (i.e. n-type) impurities. On a region of the substrate SUB between two adjacent common source lines CSL, insulating layers IL that extend in the first direction y may be sequentially provided in a third direction z. The insulating layers IL may be spaced apart by a particular distance in the third direction z. On the region of the substrate SUB between the two adjacent common source lines CSL, pillars P that are sequentially arranged in the first direction y and pass through the insulating layers IL in the third direction z are provided. For example, the pillars P contact the substrate SUB through the insulating layers IL. In detail, a surface layer S of each of the pillars P may include a silicon material having a first type and may function as a channel region. On the other hand, an internal layer I of each of the pillars P may include an insulating material such as a silicon oxide or an air gap.

In a region between the two adjacent common source lines CSL, the charge storage layer CS may include insulating layers IL, pillars P, and an exposed surface of the substrate SUB. The charge storage layer CS may also include a tunneling insulating layer, a charge trap layer, and a blocking insulating layer. In addition, in the region between the two adjacent common source lines CSL, on an exposed surface of the charge storage layer CS, a gate electrode GE such as the selection lines GSL and SSL and the word lines WL1 to WL8 is provided. Drain contacts DR may be connected to the plurality of pillars P. For example, the drain contacts DR may include a silicon material doped with the second conduction type impurities. The bit lines BL1 to BL3 extending in a second direction x and spaced apart by a particular distance in the first direction y may be connected to the drain contacts DR.

FIG. 3C is a distribution diagram exemplarily illustrating threshold voltage dispersion of the plurality of memory cells MCs illustrated in FIG. 3A. In FIG. 3C, a horizontal axis represents a threshold voltage Vth and a vertical axis represents the number of memory cells MCs.

Referring to FIG. 3C, each of the plurality of memory cells MCs may be a 3-bit multi-level cell TLC. The plurality of memory cells MCs may have an erase state E. By using the HSP method, the plurality of memory cells MCs in the erase state E may be programmed to have one of the erase state E and a first to seventh program states P1 to P7. However, the example embodiments are not limited thereto. Each of the memory cells may be a 2-bit multi-level cell MLC or a multi-level cell QLC in which four or more bits are stored.

Figure 4:
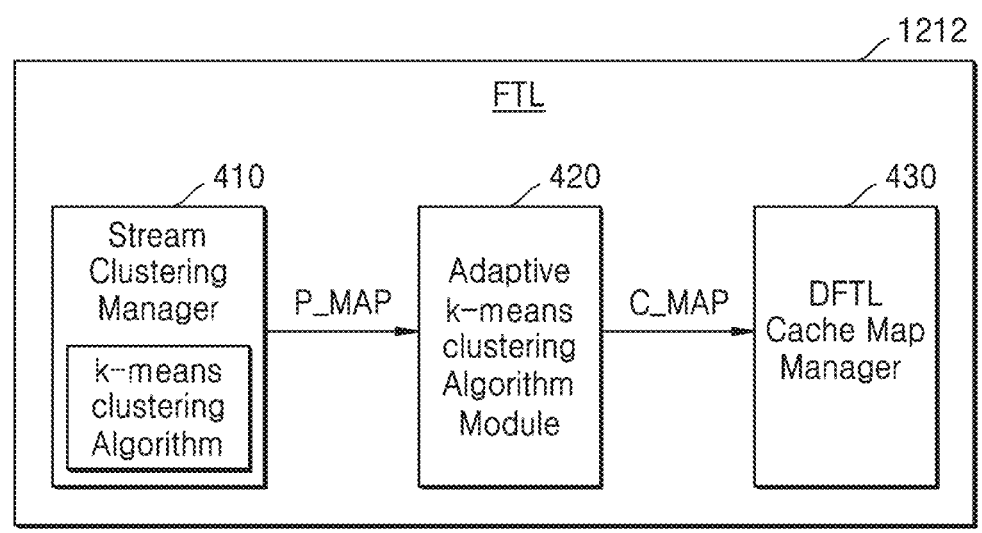
FIG. 4 is a diagram illustrating the FTL of FIG. 1 according to an example embodiment of the inventive concept.
Figure 5:
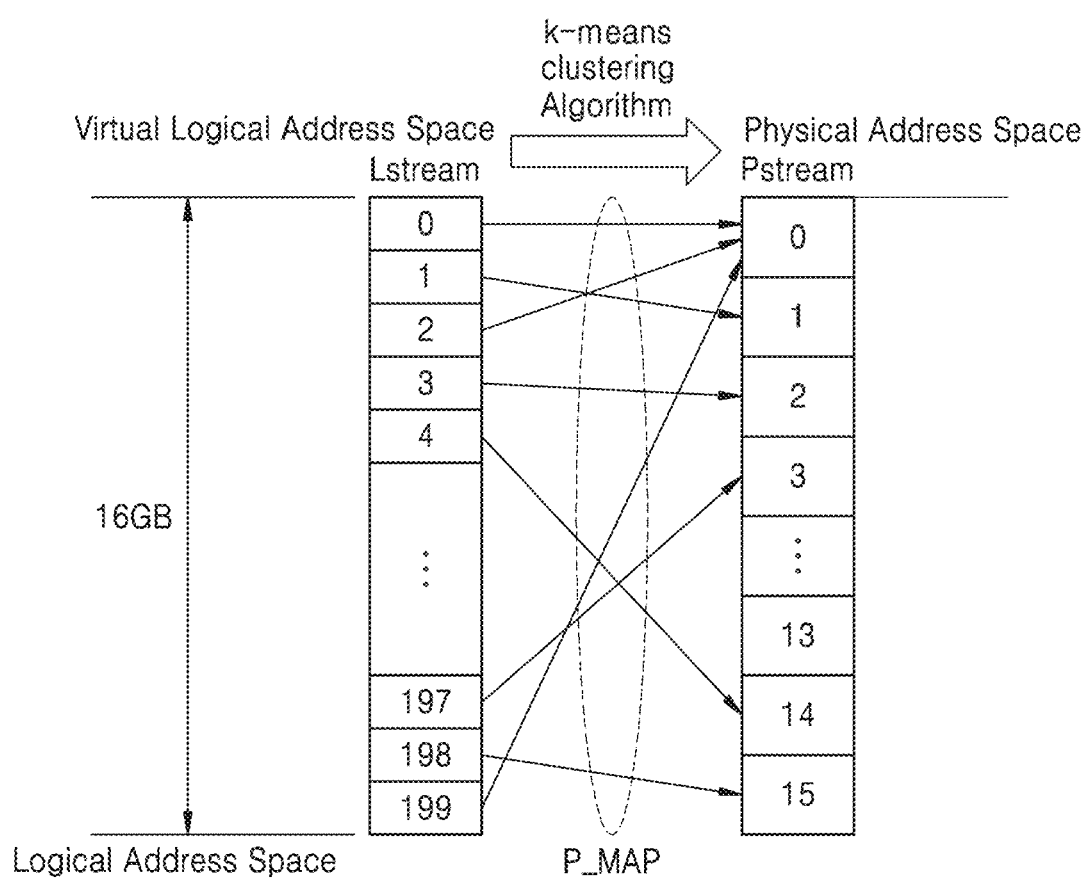
FIGS. 5 and 6 are diagrams illustrating mapping structures by the FTL of FIG. 4.
Figure 6:
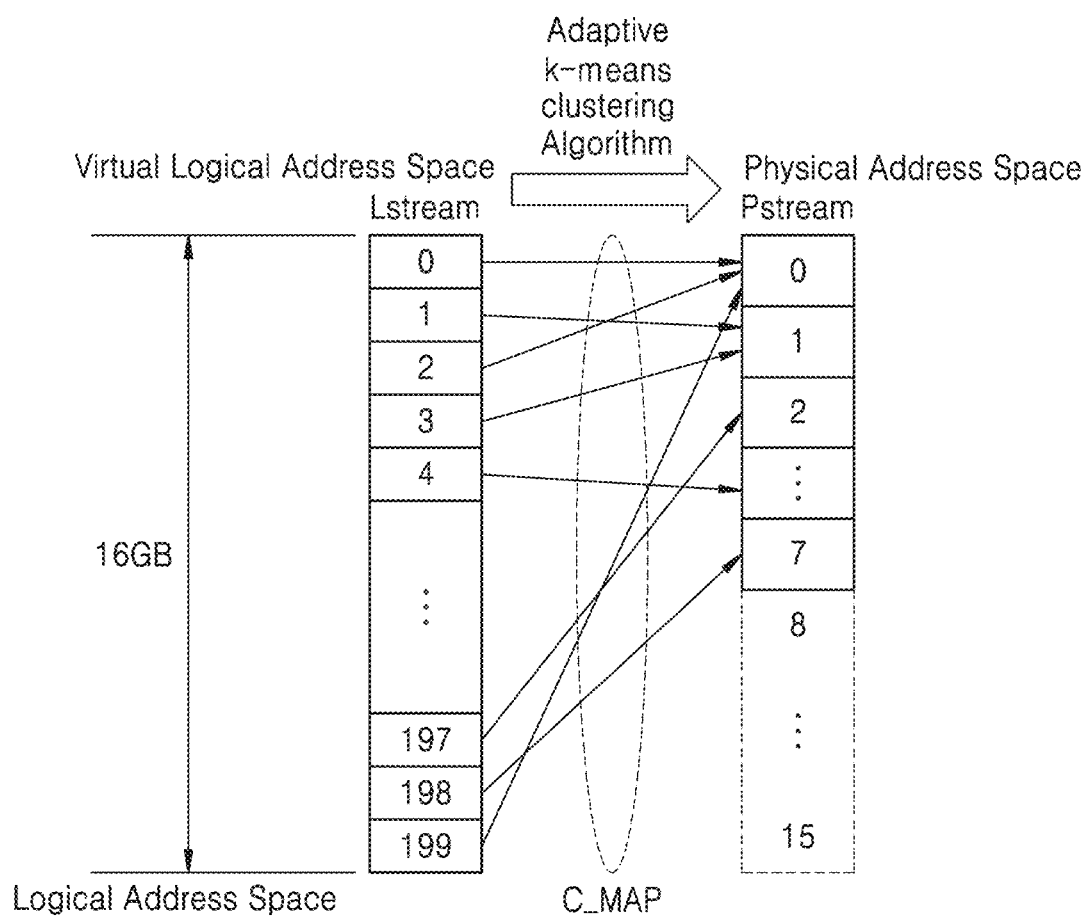

FIG. 4 is a diagram illustrating the FTL 1212 of FIG. 1 according to an example embodiment. FIGS. 5 and 6 are diagrams illustrating mapping structures formed by the FTL 1212 of FIG. 4.

Referring to FIG. 4, the FTL 1212 may be configured to translate the logical address space corresponding to the host data provided by the host 1100 (FIG. 1) into the physical addresses of the plurality of NVMs (FIG. 1). The FTL 1212 may include a stream clustering manager 410, an adaptive k-mean clustering algorithm module 420, and a DFTL cache map manager 430. The stream clustering manager 410, the adaptive k-mean clustering algorithm module 420, and the DFTL cache map manager 430 may be functionally and logically separate from each other and are not necessarily physically separate from each other or created by separate codes.

In the FTL 1212, since a module and/or a manager processes the meta data, such as the host data, the mapping data, or the stream characteristics, the module and/or manager may be referred to as a processing module. The processing module may be recognized in the form of program codes permanently stored in a non-recordable storage medium such as read only memory (ROM) devices, program codes that may be changed in a non-temporary recordable storage medium such as a floppy disk, a magnetic tape, CDs, random access memory (RAM) devices and/or other magnetic and optical mediums, or program codes transmitted to a computer through a communication medium like on an electronic network such as the Internet or telephone modem lines.

In an embodiment, the processing module may be provided as a computer program product implemented as a set of encoded commands executed by processor circuitry that responds to the commands in a software executable object. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), an electronic circuit, Programmable System-on-Chip (PSoC), a combinational logic circuit, etc.

In an embodiment, a processing module may be entirely or partially implemented by using a combination of application-specific integrated circuits (ASICs); field programmable gate arrays (FPGAs); state machines; controllers; hardware components or devices; or a combination of hardware, software, and firmware components.

The stream clustering manager 410 may analyze the host data and may group or cluster the analyzed host data to different streams. The host data may be described by the logical address space corresponding thereto. The stream clustering manager 410 may divide the total logical address space provided by the host 1100 into n (n is the number of virtual logical address clusters) and may set the n virtual logical address streams Lstreams. For example, when the total logical address space provided by the host 1100 is 16 GB, as illustrated in FIG. 5, the stream clustering manager 410 may divided the 16 GB logical address space into 200 and may set 200 virtual logical address streams Lstream 0 to Lstream 199.

The stream clustering manager 410 may trace and obtain one or more stream attributes corresponding to the n virtual logical address streams Lstreams. Stream attributes that may not be obtained may include, for example, life time, frequency, temporal locality, sequentiality, input and output I/O size, input and output I/O isolation level, quality of service (QoS) request, and/or update count.

The attribute of the life time corresponds to whether the virtual logical address streams Lstreams are measured in units of times and are expected to be stored in the SSD 1200 based on a time (for example, 10 seconds) before an arbitrary virtual logical address stream is invalidated or an amount of use by a uniform number of times. Alternatively, the lifetime may be measured from a point of view whether an arbitrary virtual logical address stream is "hot" or "cold". Here, "hot" means that the lifetime of the corresponding virtual logical address stream is short and "cold" means that the life time of the corresponding virtual logical address stream is long. The lifetime may be measured in accordance with hotness or coldness.

In an embodiment, when a particular virtual logical address stream is overwritten based on an overwrite request of the host 1100, a bitmap that represents the attribute of the life time is cleared to "0" and the attribute of the life time may be represented by a totaled update count value of the bitmap "0". The update count value may be considered as the number of times of overwrites. Virtual logical address streams having high update count values may represent frequently used hot streams and virtual logical address streams having low update count values may represent cold streams that are not frequently used.

The attribute of the frequency may correspond to how frequently particular virtual logical address streams Lstreams may be accessed as a result of a host data input. In order to obtain the attribute of the frequency, when the number of times of accesses to an arbitrary virtual logical address stream is greater than a previously set threshold value, a bitmap that represents the attribute of the frequency corresponding to the virtual logical address stream is allotted as "1" and, if not, the bitmap that represents the attribute of the frequency corresponding to the virtual logical address stream is allotted as "0."

The attribute of the temporal locality may correspond to how frequently particular virtual logical address streams Lstreams are tried to be accessed. In order to obtain the attribute of the temporal locality, particular virtual logical address streams accessed after a previously set threshold value (for example, a threshold value of 50%) of the maximum timestamp may be allotted to a bitmap that represents the attribute of the temporal locality as "1" to be displayed as recent ones or may be allotted as "0." The timestamp may include information such as generation time, modification time, and read time for storing data in a corresponding virtual logical address stream.

The attribute of the sequentiality may correspond to whether the host data input tries to access particular virtual logical address streams in a sequential order. In order to obtain the sequentiality of the data, the previous particular virtual logical address streams may be looked up from a previously defined window size. When it is found that the previous particular virtual logical address streams coincide with each other, a bitmap that represents the attribute of the sequentiality is allotted as "1" and, if not, the bitmap that represents the attribute of the sequentiality may be allotted as "0."

The attribute of the input and output I/O size may correspond to whether the host data input is written in or read from two or more pages at a time. The attribute of the input and output I/O isolation level may correspond to whether the host data input requires data isolated from another data at channel, way, plane or block levels of the NVMs. The attribute of the QoS request may correspond to latency requirements for a bandwidth used by input and output requests for data. The input and output requests can be for written or read data.

The stream clustering manager 410 may translate then virtual logical address streams Lstreams into k physical address streams Pstream of the plurality of NVMs based on an attribute selected from the attributes corresponding to the n virtual logical address streams Lstreams, where k represents the number of physical address clusters. For convenience sake, the plurality of NVMs 1230 to 1250 are illustrated as allotted to 16 physical address streams Pstream 0 to Pstream 15, but the embodiments are not limited to this configuration.

In the current embodiment, the stream clustering manager 410 uses a valid bitmap material used by the FTL 1212 while managing a mapping unit based on the attribute of the lifetime among the attributes corresponding to the n virtual logical address streams Lstreams.

The stream clustering manager 410 may obtain bitmap "0" update counts of the attributes of the life times of the 200 virtual logical address streams Lstream 0 to Lstream 199 as illustrated in TABLE 1.

TABLE 1

| Lstream Index | Bitmap "0" Update Counts |
| --- | --- |
| 0 | 10 |
| 1 | 500 |
| 2 | 2 |
| 3 | 1000 |
| ... | ... |
| 198 | 50000 |
| 199 | 0 |

The stream clustering manager 410 groups or clusters virtual logical address streams with similar bitmap "0" update counts among the virtual logical address streams Lstream 0 to Lstream 199 of TABLE 1 and maps the virtual logical address streams to the corresponding physical address streams Pstream 0 Pstream 15. As illustrated in FIG. 5, the stream clustering manager 410 may perform a k-mean clustering algorithm for clustering virtual logical address streams Lstreams having similar update counts for the 200 virtual logical address streams Lstream 0 to Lstream 199. For example, assuming that k=16, the stream clustering manager 410 may generate the preliminary cluster mapping table P_MAP for translating addresses so that the 200 virtual logical address streams Lstream 0 to Lstream 199 are mapped to the 16 physical address streams Pstream 0~Pstream 15.

The k-mean clustering algorithm may be proportional to the probability that a corresponding virtual address stream Lstream belongs to a corresponding physical address stream Pstream and a distance between a centroid of the corresponding virtual address stream Lstream and a centroid of the corresponding physical address stream Pstream. The k-mean clustering algorithm may execute a clustering technique of minimizing an object function J represented by EQUATION 1.

$$J = \sum_{j=0}^{k-1} \sum_{i=0}^{n-1} (P(Cj\,|\,Xi))^{\Phi} \cdot D_{ij}^2 \qquad \text{[EQUATION 1]}$$

Wherein, i and j respectively represent indexes of virtual logical address streams Lstreams and indexes of physical address streams Pstreams, n is the number of virtual logical address streams Lstreams, and k is a parameter that represents the number of clusters to be obtained by clustering. In the current embodiment, n may be set as 200 and k may be set as 16. φ is a fuzzy index. When φ is 0, φ represents an object function in accordance with a common k-mean clustering algorithm. In an embodiment, φ may be set to be greater than 1.

In EQUATION 1, $(P(Cj|Xi))^{\Phi}$ represents the probability that a corresponding virtual address stream Lstream Xi belongs to a cluster based on Cj and $D_{ij}^2$ represents the Mahalanobis distance represented by EQUATION 2.

$$D_{ij} = \sqrt{(Xi-Cj)^T S_q^{-1} (Xi-Cj)} \qquad \text{[EQUATION 2]}$$

The Mahalanobis distance is a value that represents how many standard deviations away a physical address stream Pstream is from a centroid. The centroid may be the mean of physical address streams Pstreams based on selected attributes of virtual logical address streams Lstreams. When the Mahalanobis distance is large, the physical address stream Pstream may be considered to be remote from the centroid. When the Mahalanobis distance is small, the physical address stream Pstream may be considered to be close to the centroid.

In the k-mean clustering algorithm, a probability value may be allotted by uniform probability distribution by using EQUATION 3 at an initialization state.

$$\sum_{j=0}^{k-1} P(Cj\,|\,Xi) = 1, \qquad \text{[EQUATION 3]}$$

$$i = 0, 1, \ldots, n-1$$

In the k-mean clustering algorithm, P(Cj|Xi) and Cj, in which the object function J of the EQUATION 1 is minimized, are values in which a result of partially differentiating the object function J by P(Cj|Xi) and Cj is 0 and are represented by EQUATIONS 4 and 5.

$$P(Cj\,|\,Xi) = \frac{(1/Dij)^{1/(\Phi-1)}}{\sum_{r=0}^{k-1} (1/Dij)^{1/(\Phi-1)}} \qquad \text{[EQUATION 4]}$$

-continued $$Cj = \frac{\sum_{i=0}^{n-1} (P(Cj|Xi))^{\Phi} \cdot Xi}{\sum_{i=0}^{n-1} (P(Cj|Xi))^{\Phi}}$$ [EQUATION 5]

In the k-mean clustering algorithm, EQUATIONS 4 and 5 may be repeatedly performed until sufficiently converged data is secured. For example, EQUATIONS 4 and 5 may be performed until the number of times of repetition is no less than a previously set number, there is no change in members of clustering, or there is a value of the object function J less than a previously set threshold value.

The stream clustering manager 410 may generate the preliminary cluster mapping table P_MAP for translating the addresses so that the 200 virtual logical address streams Lstream 0 to Lstream 199 are mapped to the 16 physical address streams Pstream 0~Pstream 15 as illustrated in TABLE 2 by performing the k-mean clustering algorithm based on the bitmap "0" update counts of the attributes of the life times of the TABLE 1.

TABLE 2

| Lstream Index | Pstream Index |
|---|---|
| 0 | 0 |
| 1 | 1 |
| 2 | 0 |
| 3 | 2 |
| ... | ... |
| 198 | 15 |
| 199 | 0 |

Referring to FIG. 5, by the preliminary cluster mapping table P_MAP of the TABLE 2, the virtual logical address stream Lstream 0 may be translated into the physical address stream Pstream 0, the virtual logical address stream Lstream 1 may be translated into the physical address stream Pstream 1, the virtual logical address stream Lstream 2 may be translated into the physical address stream Pstream 0, and the virtual logical address stream Lstream 3 may be translated into the physical address stream Pstream 2. The virtual logical address steams Lstream 4 to Lstream 197 may be translated into the physical address streams Pstream 0 to Pstream 15. The virtual logical address stream Lstream 198 may be translated into the physical address stream Pstream 15 and the virtual logical address stream Lstream 199 may be translated into the physical address stream Pstream 0.

The adaptive k-mean clustering algorithm module 420 may be configured so that an adaptive k-mean clustering algorithm is performed on the preliminary cluster mapping table P_MAP that represents mapping information between the n virtual logical address streams Lstreams and the k physical address streams Pstreams.

The adaptive k-mean clustering algorithm module 420 may calculate a centroid among the k physical address streams Pstreams, may calculate a distance among the k physical address streams Pstreams, and may merge close physical address streams Pstreams based on the selected attributes of the n virtual logical address streams Lstreams. The adaptive k-mean clustering algorithm module 420 may repeatedly perform the adaptive k-mean clustering algorithm so that the number of physical address streams Pstreams mapped to the n virtual logical address streams Lstreams is reduced. The adaptive k-mean clustering algorithm module 420 may merge and cluster the close physical address streams Pstreams and may allot physical address streams that are not clustered to new clusters.

Therefore, the adaptive k-mean clustering algorithm module 420 may generate the condensed cluster mapping table C_MAP (FIG. 6) for translating the n virtual logical address streams Lstreams into the c physical address streams Pstreams by condensing the k physical address streams Pstreams mapped to the n virtual logical address streams Lstreams of the preliminary cluster mapping table P_MAP, where c represents a number less than k.

In an example embodiment, the adaptive k-mean clustering algorithm module 420 may change the value k used for the k-mean clustering algorithm into the value c based on the minimum distance, the mean distance, or the maximum distance between the clusters adaptively obtained in each workload based on uniform time stamps during the write operation in the host 1100.

The adaptive k-mean clustering algorithm module 420 may generate the condensed cluster mapping information C_MAP for translating the 200 virtual logical address streams Lstream 0 to Lstream 199 into the eight physical address streams Pstream 0 to Pstream 7 as illustrated in FIG. 6.

For example, by utilizing the condensed cluster mapping table C_MAP of FIG. 6, the virtual logical address stream Lstream 0 may be translated into the physical address stream Pstream 0, the virtual logical address stream Lstream 1 may be translated into the physical address stream Pstream 1, the virtual logical address stream Lstream 2 may be translated into the physical address stream Pstream 0, and the virtual logical address stream Lstream 3 may be translated into the physical address stream Pstream 1. The virtual logical address streams Lstream 4 to Lstream 197 may be translated into the physical address streams Pstream 0 to Pstream 7. The virtual logical address stream Lstream 198 may be translated into the physical address stream Pstream 7 and the virtual logical address stream Lstream 199 may be translated into the physical address stream Pstream 0.

A size (the k physical address streams) of the cluster mapping table C_MAP condensed by the adaptive k-mean clustering algorithm module 420 may be less than that (the c (c<k) physical address streams) of the preliminary cluster mapping table P_MAP. The FTL 1212 may store the condensed cluster mapping table C_MAP in the stream mapping table 720 of the volatile memory device 1260. Therefore, in the data buffer 730 of the volatile memory device 1260, the c data buffers corresponding to the c physical address streams of the condensed cluster mapping table C_MAP may be maintained. In the data buffer 730 of the volatile memory device 1260, a data buffer space corresponding to the k-c non-mapped physical address streams may be empty.

The FTL 1212 may be configured to extend the data buffer space corresponding to the k-c non-mapped physical address streams in the data buffer 730 of the volatile memory device 1260 to the DFTL map cache 710. That is, the FTL 1212 may adaptively change the number of physical address streams that are not used in the data buffer 730 of the volatile memory device 1260 and may use the data buffer space as the DFTL map cache 710.

The FTL 1212 may manage a mapping table for translating a logical address space corresponding to the host data provided by the host 1110 into physical addresses of the plurality of NVMs. The FTL 1212 may perform a page mapping method in which mapping is performed in units of pages, a blocking mapping method in which mapping is performed in units of blocks, and a hybrid mapping method obtained by taking advantages of the page mapping method and the block mapping method in accordance with a unit of the mapping table.

Since the mapping may be performed based on a page that is the smallest unit of writing in the page mapping method, as the storage space of the NVMs increases, the size of the mapping table increases and the storage space of the voltage memory device 1260, which is required for maintaining the mapping table, also increases. The above problem may be solved by a DFTL method in which only a part of a required mapping table is loaded in the volatile memory device 1260.

In the DFTL method, like in the page mapping method, the mapping table may be managed in units of pages. However, in the DFTL method, instead of loading the mapping table in the volatile memory device 1260, the mapping table may be cached. In the DFTL method, by loading the cached mapping table in the volatile memory device 1260, the use of the volatile memory device 1260 may be reduced while generating the same result as the page mapping method during address translation. However, in the DFTL method, when an address does not exist in the cached mapping table, in order to call in the corresponding address, additional read and write operations of the NVM occur and, accordingly, overhead occurs. In order to solve this problem, the FTL 1212 may execute a cache exchange policy for increasing a success rate of access by using the DFTL cache map manager 430.

The DFTL cache map manager 430 may increase or reduce the data buffer space used by the DFTL map cache 710 by the size of the data buffer 730 of the volatile memory device 1260 allotted to the non-mapped physical address streams by applying the condensed cluster mapping information C_MAP generated by the adaptive k-mean clustering algorithm module 420.

The DFTL cache map manager 430 may be configured to store a part of the mapping table frequently referred to by the condensed cluster mapping table C_MAP in the DFTL cache map 710 of the volatile memory device 1260 and to store the remaining mapping table in the NVM.

The DFTL cache map manager 430 may provide a valid state or a cache hit to a cache line of the DFTL cache map 710 by using the cache exchange policy. The cache exchange policy may be a least recently used (LRU) method, least frequently used (LFU) method, a random method, or a first in first out (FIFO) method.

In the LRU method, the least recently used cache line or block may be exchanged or expired. For example, whenever access to the volatile memory device 1260 is made, the LRU bit for the valid cache line may be updated. The LRU bit that represents a recent access order may be used as information by which the least recently used block or the longest lived may be grasped when the cache line exchange occurs. In the LFU method, the least used block after being stored in the volatile memory device 1260 may be exchanged. In the random method, an arbitrary block of the volatile memory device 1260 may be selected and exchanged. In the FIFO method, the block stored longest in the volatile memory device 1260 may be exchanged.

Figure 7:
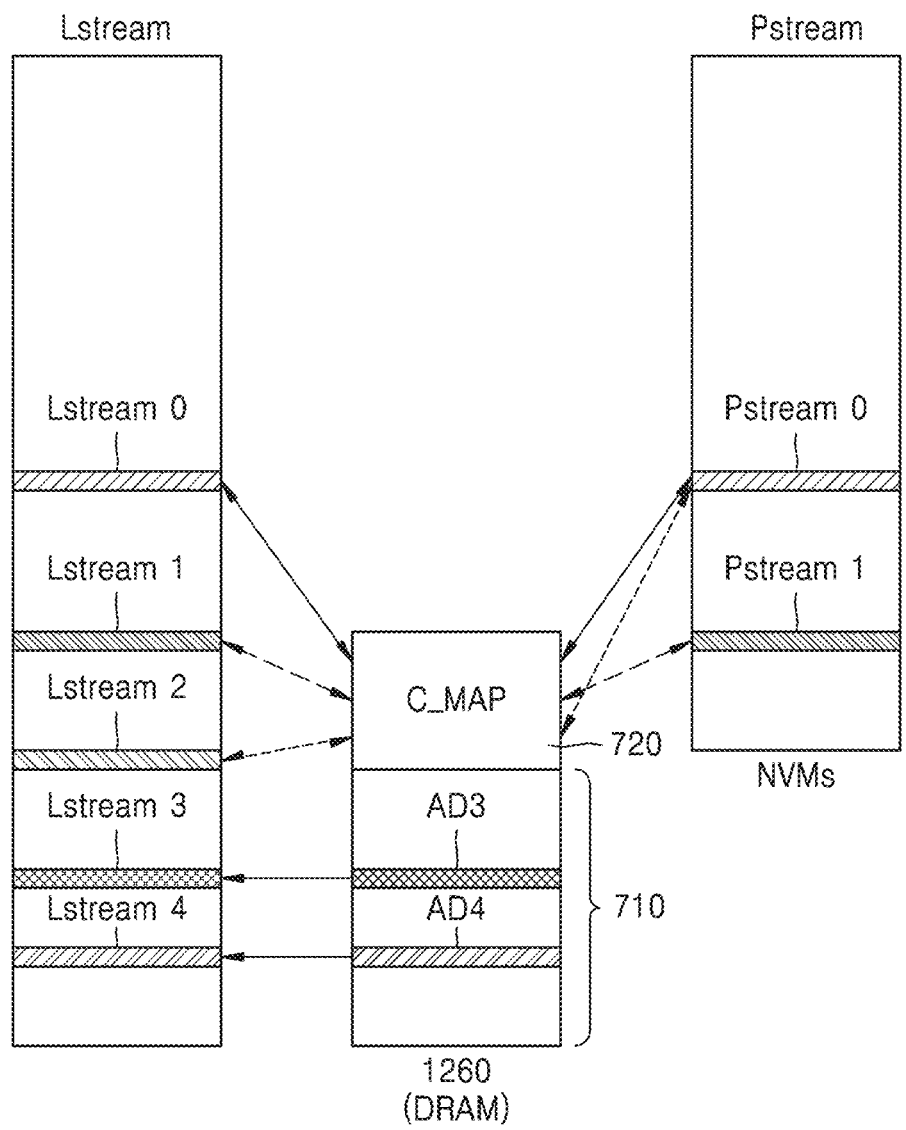
FIGS. 7 and 8 are diagrams illustrating data mapping of a volatile memory device in accordance with an FTL of an example embodiment.
Figure 8:
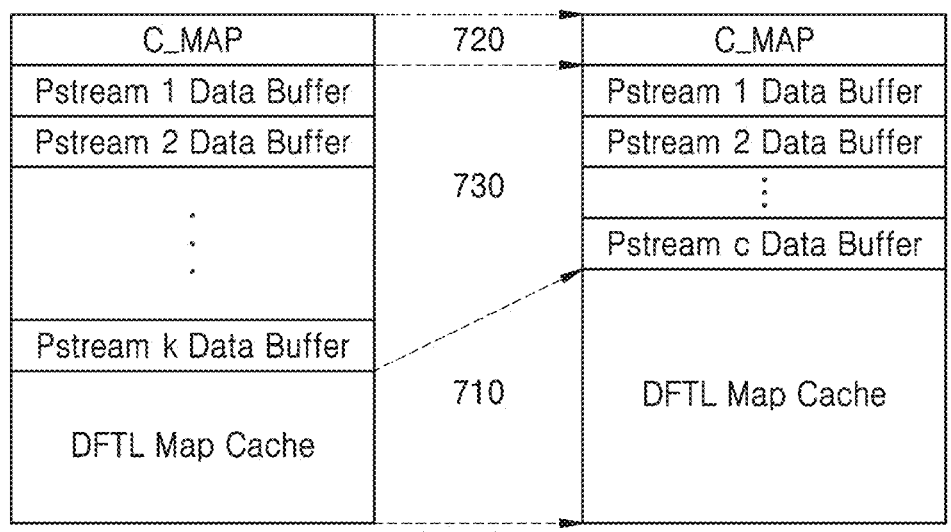

FIGS. 7 and 8 are diagrams illustrating data mapping of the volatile memory device 1260 in accordance with an FTL according to an example embodiment.

Referring to FIG. 7, data mapping between the virtual logical address streams Lstream 0 Lstream 4 provided by the FTL 1212 and the volatile memory device 1260 is illustrated. The virtual logical address streams Lstream 3 and Lstream 4 are respectively stored in memory regions AD3 and AD4 of the DFTL map cache 710 of the volatile memory device 1260. The virtual logical address streams Lstream 0 to Lstream 2 may be mapped to the physical address streams Pstreams of the NVMs through the stream mapping table 720 of the volatile memory device 1260.

In FIG. 7, in the stream mapping table 720 of the volatile memory device 1260, the condensed cluster mapping table C_MAP provided by the stream clustering manager 410 is stored.

As illustrated in FIG. 8, in the data buffer 730 of the volatile memory device 1260, in a space of data buffers allotted to the k physical address streams, by the condensed cluster mapping table C_MAP, only a space of data buffers allotted to the c physical address streams is used. In the data buffer 730 of the volatile memory device 1260, a space of data buffers allotted to the k-c non-mapped physical address streams may extend to the DFTL cache map 710 by the DFTL cache map manager 430. Therefore, the FTL 1212 may provide high-availability capability and scalability.

As the DFTL cache map 710 extends, data that may be loaded in the DFTL cache map 710 may increase. Since the FTL 1212 does not have to access the NVMs for the data loaded in the DFTL cache map 710, latency may be reduced. Therefore, the SSD 1200 may exhibit improved performance with a high response speed.

Figure 9:
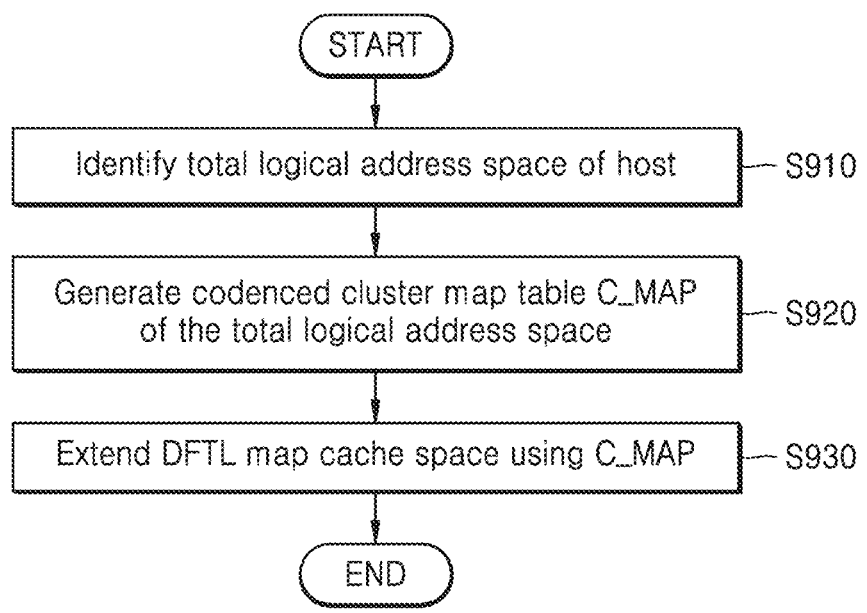
FIGS. 9 to 11 are diagrams illustrating a method of operating a data storage device including an FTL according to an example embodiment.
Figure 10:
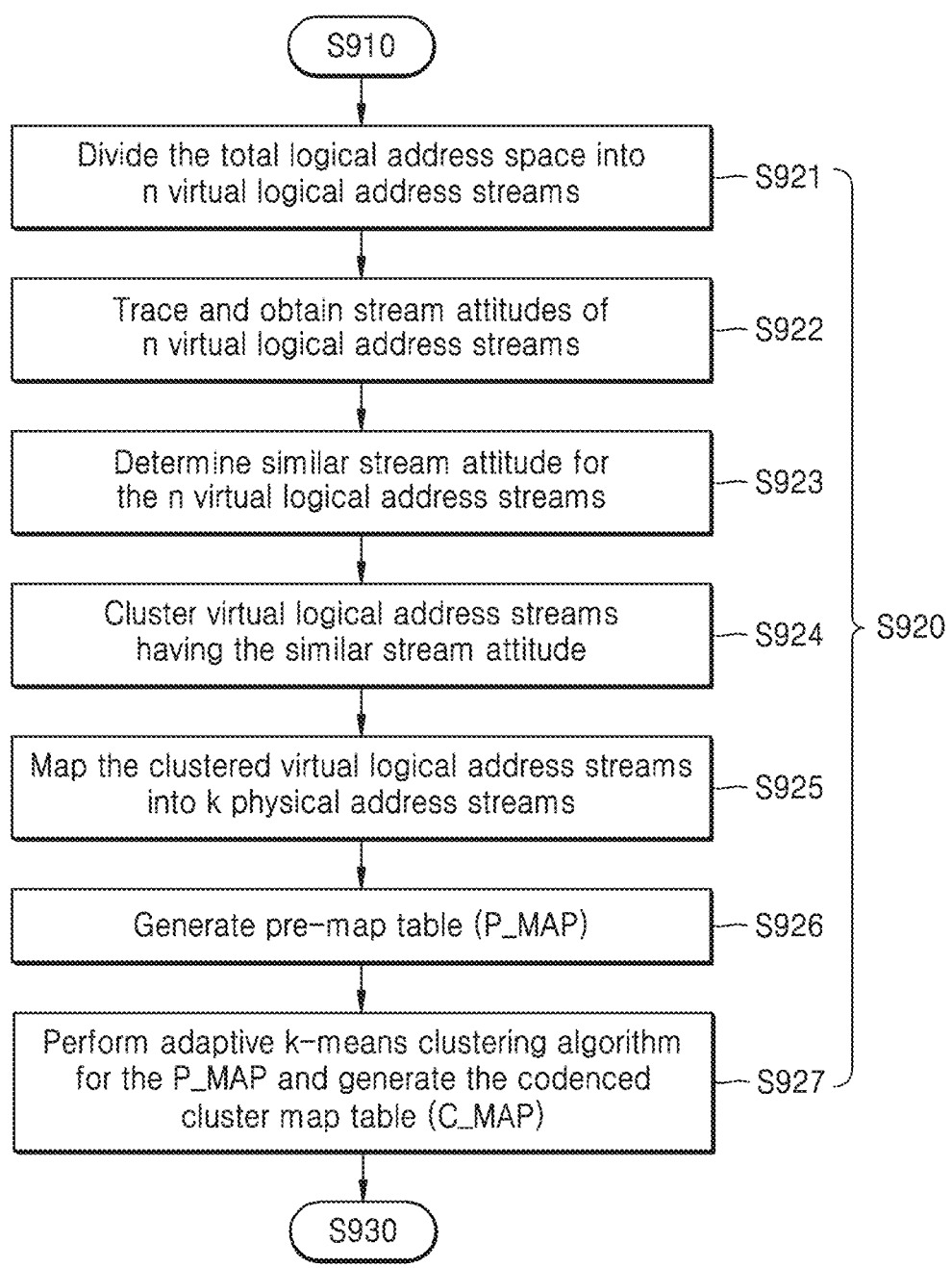
Figure 11:
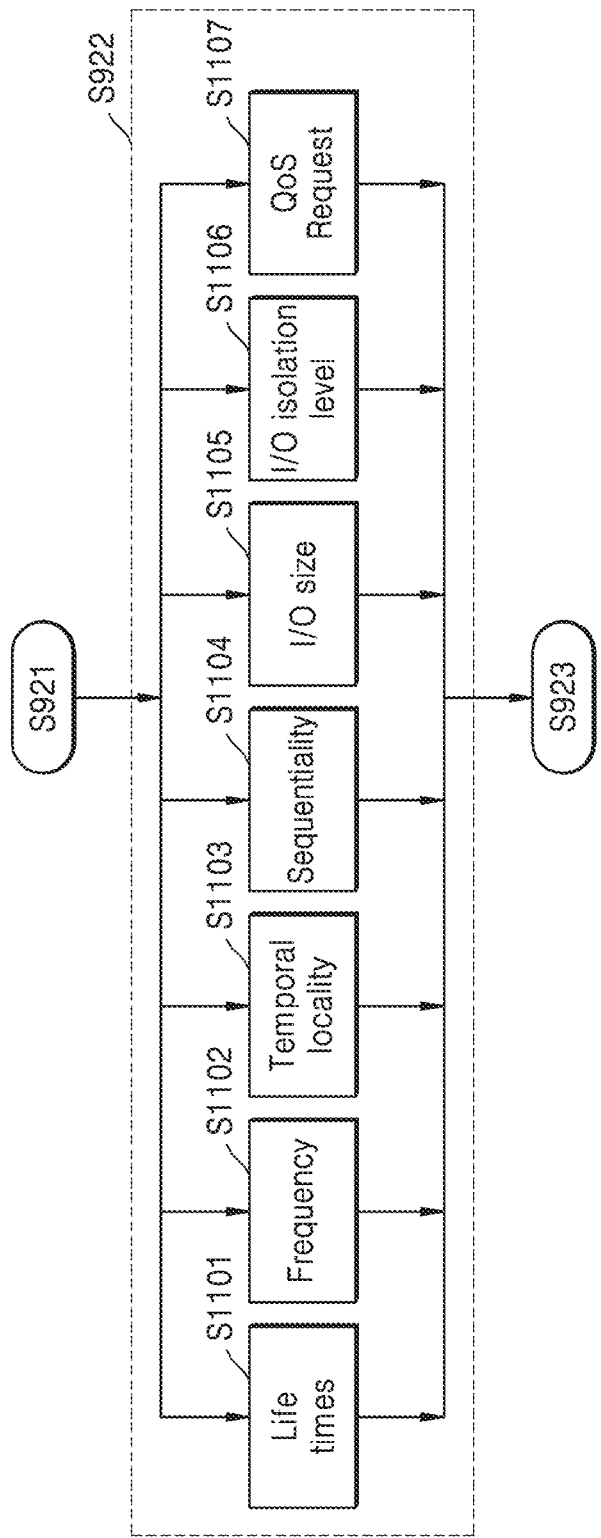

FIGS. 9 to 11 are diagrams illustrating a method of operating a data storage device including the FTL 1212 according to an example embodiment.

Referring to FIG. 9 together with FIGS. 1 to 8, the FTL 1212 may manage mapping information between the n logical address streams of the host and the k physical address streams of the NVMs, where k represents a number less than n. The FTL 1212 of the SSD 1200 may identify the total logical address space for input and output requests received from the host 1100 in operation S910. The FTL 1212 may generate the condensed cluster mapping table C_MAP for the total logical address space in operation S920. Operation S920 in which the FTL 1212 may generate the condensed cluster mapping table C_MAP will be described in detail in FIGS. 10 and 11.

Referring to FIG. 10, the FTL 1212 may divide the total logical address space into n and may set the n spaces as the n virtual logical address streams Lstreams in operation S921. The FTL 1212 may trace and obtain at least one stream attribute corresponding to the n virtual logical address streams Lstreams in operation S922.

As illustrated in FIG. 11, operation S922 in which the FTL 1212 traces and obtains at least one stream attribute corresponding to the n virtual logical address streams Lstreams may correspond to one of operation S1101 of tracing and obtaining the life time, operation S1102 of tracing and obtaining the frequency, operation S1103 of tracing and obtaining the temporal locality, operation S1104 of tracing and obtaining the sequentiality, operation S1105 of tracing and obtaining the input and output I/O size, operation S1106 of tracing and obtaining the input and output I/O isolation level, and operation S1107 of tracing and obtaining the QoS request.

Referring to FIG. 10 again, the FTL 1212 may identify virtual logical address streams having similar stream attributes among the n virtual logical address streams Lstreams based on at least one stream attribute in operation S923. The FTL 1212 may cluster virtual logical address streams having similar stream attributes in operation S924 and may map the n virtual logical address streams Lstreams clustered by using the k-mean clustering algorithm to the k physical address streams Pstreams in operation S925. The FTL 1212 may generate the preliminary cluster mapping table P_MAP that represents the mapping information between the n virtual logical address streams and the k physical address streams in operation S926.

The FTL 1212 may generate the condensed cluster mapping table C_MAP for performing the adaptive k-mean clustering algorithm on the preliminary cluster mapping table P_MAP and translating the n virtual logical address streams into the c physical address streams in operation S927.

Referring to FIG. 9 again, based on the condensed cluster mapping table C_MAP, in the data buffer 730 of the volatile memory device 1260, the FTL 1212 may extend the space of the data buffers allotted to the non-mapped physical address streams to the DFTL cache map 710 in operation S930.

Figure 12A:
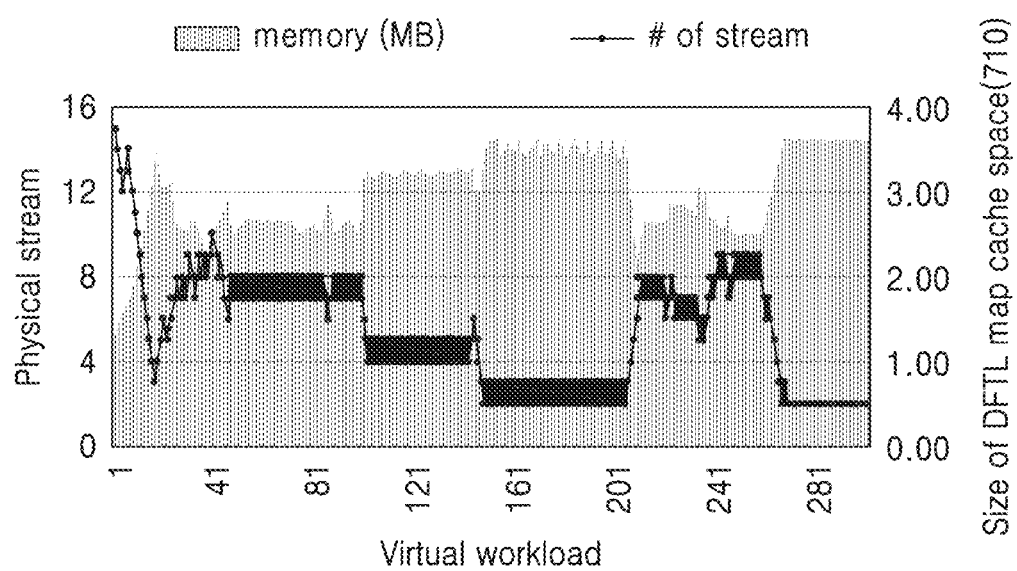
FIGS. 12A to 12C and 13 are diagrams illustrating performance evaluations obtained by performing an FTL on various workloads according to an example embodiment.
Figure 12B:
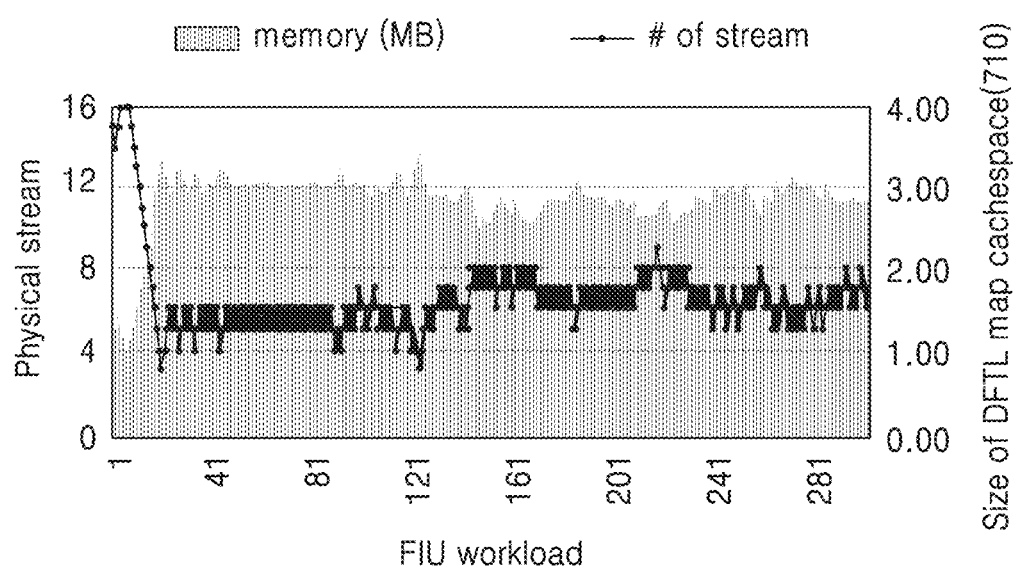
Figure 12C:
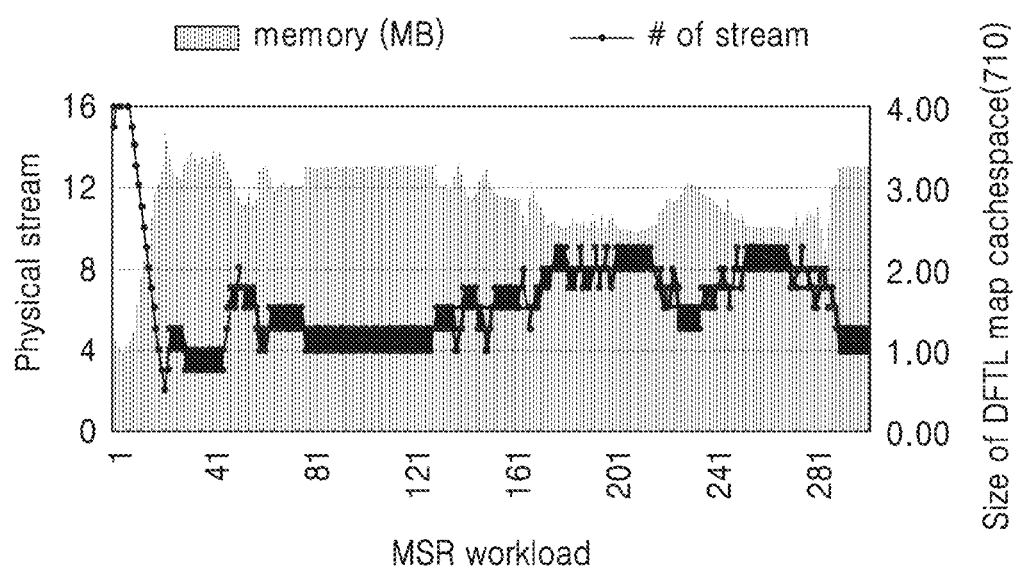

FIGS. 12A to 12C and 13 are diagrams illustrating performance evaluations obtained by performing an FTL on various workloads according to example. In FIGS. 12A to 12C, the x axis represents timestamps, the left y axis represents the number of physical address streams used by the condensed cluster mapping table C_MAP, and the right y axis represents a size of the DFTL map cache 710 by the condensed cluster mapping table C_MAP and the DFTL cache map manager 430. FIGS. 12A to 12C and 13 illustrate simulation results in a state in which the maximum usable space size of the stream mapping table 720 is limited to 4 MB.

FIG. 12A illustrates the number and size of physical address streams changed by the condensed cluster mapping table C_MAP in accordance with timestamps of the virtual workload. In the virtual workload, it may be noted that, as the timestamps increase, the number of physical address streams, which starts from 16, significantly changes to 2 to 10. Therefore, in the virtual workload, it may be noted that the size of the DFTL cache 710 occupied by the condensed cluster mapping table C_MAP has a large fluctuation rate between 2.5 MB to 3.5 MB as the timestamps increase.

FIG. 12B illustrates the number and size of physical address streams changed by the condensed cluster mapping table C_MAP in accordance with the timestamps of the FIU workload. In the FIU workload, it may be noted that, as the timestamps increase, the number of physical address streams, which starts from 16, insignificantly changes to 4 to 8. Therefore, in the FIU workload, it may be noted that the size of the DFTL map cache 710 occupied by the condensed cluster mapping table C_MAP is about 3 MB even though the timestamps increase.

FIG. 12C illustrates the number and size of physical address streams changed by the condensed cluster mapping table C_MAP in accordance with the timestamps of MSR workload. In the MSR workload, it may be noted that, as the timestamps increase, the number of physical address streams, which starts from 16, changes to 3 to 9. Therefore, in the MSR workload, it may be noted that the size of the DFTL map cache 710 occupied by the condensed cluster mapping table C_MAP is about 2.5 MB to 3 MB as the timestamps increase.

As illustrated in FIGS. 12A to 12C, the FTL 1212 includes the least number of physical address streams and occupies a lesser part of the DFTL map cache 710 in the FIU and MSR workloads than in the virtual workload.

Figure 13:
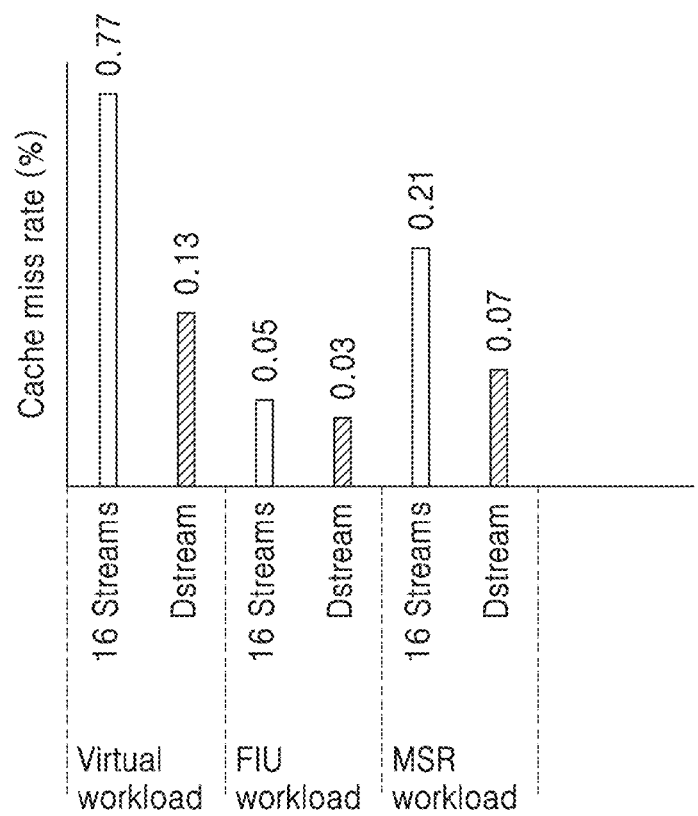

In FIG. 13, the preliminary cluster mapping table P_MAP generated by the FTL 1212 is displayed by 16 streams, and a result of the adaptively controlling streams, in accordance with the condensed cluster mapping table C_MAP generated by the adaptive k-mean clustering algorithm module 420, is displayed by the dynamic stream (Dstream). Referring to FIG. 13, when the 16 streams and Dstream are performed in various workloads Virtual, FU, and MSR, a cache miss rate of the DFTL map cache 710 is illustrated. It may be noted that the cache miss rate is significantly reduced in the workloads Virtual, FIU, and MSR in comparison with the 16 streams. Thus, as the data buffer 730 adaptively reduced by the Dstream in the volatile memory device 1260 extends to the DFTL map cache 710, it may be understood that the cache miss rate is reduced.

While example embodiments have been particularly shown and described, it will be understood by people having ordinary skill in the art that various changes in form and details may be made therein without departing from the spirit and scope of the following claims.

What is claimed is:

1. A data storage device comprising:
   non-volatile memory devices (NVMs);
   a volatile memory device; and
   a controller configured to control the NVMs and the volatile memory device in response to input and output requests received from a host by using an FTL to manage mapping information between logical address streams of the host and physical address streams of the NVMs,
   wherein the FTL is configured to generate a preliminary cluster mapping table for dividing a total logical address space for input and output requests received from the host into n spaces, setting the n spaces as n virtual logical address streams, and mapping the n virtual logical address streams to k physical address streams and to generate a condensed cluster mapping table for mapping the n virtual logical address streams to physical address streams by performing an adaptive k-mean clustering algorithm on the preliminary cluster mapping table,
   wherein n represents an integer, k represents a number less than n, and c represents a number less than k.

2. The data storage device of claim 1,
   wherein the FTL is configured to use a DFTL method to generate a cache cluster mapping table,
   the cache cluster mapping table configured as a part of a mapping table referred to by the condensed cluster mapping table.

3. The data storage device of claim 2, wherein the FTL is configured to exchange the least recently used (LRU) mapping data among mapping data items stored in the cache cluster mapping table.

4. The data storage device of claim 2, wherein the volatile memory device comprises:
   a DFTL map cache configured to store the cache cluster mapping table;
   a stream map table configured to store the condensed cluster mapping table; and
   a data buffer configured to store data of the input and output requests of the host.

5. The data storage device of claim 4, wherein the FTL is configured to extend the data buffer allotted to k-c non-mapped physical address streams to the DFTL map cache by using the condensed cluster mapping table.

6. The data storage device of claim 1, wherein the FTL is configured to generate the preliminary cluster mapping table by tracing and obtaining one or more stream attributes corresponding to the n virtual logical address streams, selecting one of the one or more obtained stream attributes, clustering virtual logical address streams having similar stream attributes in accordance with the selected stream attribute, and mapping the clustered virtual logical address streams to the k physical address streams.

7. The data storage device of claim 6, wherein the one or more obtained stream attributes are related to a life time, a frequency, a temporal locality, a sequentiality, an input and output I/O size, an input and output I/O isolation level, and a quality of service (QoS) request of the n virtual logical address streams.

8. The data storage device of claim 1, wherein the FTL is configured to generate the condensed cluster mapping table by repeatedly calculating a centroid between the k physical address streams, calculating a distance between the k physical address streams, and merging close physical address streams by using the adaptive k-mean clustering algorithm.

9. A flash translation layer (FTL) comprising:
processing circuitry configured to generate a preliminary cluster mapping table by dividing a total logical address space for input and output requests received from a host into n spaces, setting the n spaces as n virtual logical address streams, and mapping the n virtual logical address streams to k physical address streams in accordance with selected stream attributes of the n virtual logical address streams, where n represents an integer, and k represents a number less than n; and
the processing circuitry configured to configured to generate a condensed cluster mapping table,
the processing circuitry configured to map the n virtual logical address streams to c physical address streams by performing an adaptive k-mean clustering algorithm on the preliminary cluster mapping table, where c represents a number less than k.

10. The FTL of claim 9, wherein the processing circuitry is configured to generate a cache cluster mapping table by using a DFTL method,
the cache cluster mapping table configured as a part of a mapping table referred to by the condensed cluster mapping table.

11. The FTL of claim 10, wherein the processing circuitry is configured to use the condensed cluster mapping table to extend a data buffer space of volatile memory allotted to k-c non-mapped physical address streams to store the cache cluster mapping table.

12. The FTL of claim 9, wherein the processing circuitry is configured to trace and obtain one or more stream attributes corresponding to the n virtual logical address streams, to select one of the obtained stream attributes, and to provide the selected one as the selected stream attribute, and
wherein the one or more obtained stream attributes are related to a life time, a frequency, a temporal locality, a sequentiality, an input and output I/O size, an input and output I/O isolation level, and a quality of service (QoS) request of the n virtual logical address streams.

13. The FTL of claim 9, wherein the processing circuitry is configured to generate the condensed cluster mapping table by repeatedly calculating a centroid between the k physical address streams, calculating a distance between the k physical address streams, and merging close physical address streams, based on the selected attributes of the n virtual logical address streams.

14. A method of operating a data storage device including non-volatile memory devices (NVMs), a volatile memory device, and a controller comprising:

dividing a total logical address space for the input and output requests of a host into n spaces and setting the n spaces as n virtual logical address streams, where n represents an integer;
generating a preliminary cluster mapping table configured to map the n virtual logical address streams to k physical address streams, where k represents a number less than n;
generating a condensed cluster mapping table configured to map the n virtual logical address streams to c physical address streams by performing a k-mean clustering algorithm on the preliminary cluster mapping table, where c represents a number less than k; and
generating a cache cluster mapping table configured as a part of a mapping table frequently referred to by the condensed cluster mapping table by using a DFTL method for the condensed cluster mapping table.

15. The method of claim 14, further comprising:
storing the cache cluster mapping table in a DFTL map cache of the volatile memory device;
storing the condensed cluster mapping table in a stream map table of the volatile memory device; and
storing data of the input and output requests of the host in a data buffer.

16. The method of claim 15, further comprising extending the data buffer allotted to k-c non-mapped physical address streams to the DFTL map cache by using the condensed cluster mapping table.

17. The method of claim 14, wherein the generating of the preliminary cluster mapping table comprises:
tracing and obtaining at least one stream attribute corresponding to the n virtual logical address streams;
clustering virtual logical address streams having similar stream attributes among the n virtual logical address streams based on the at least one stream attribute and mapping the clustered virtual logical address streams to k physical address streams; and
generating the preliminary cluster mapping table in accordance with mapping information between the n virtual logical address streams and the k physical address streams.

18. The method of claim 17, wherein the at least one stream attribute is one of attributes related to a life time, a frequency, a temporal locality, a sequentiality, an input and output I/O size, an input and output I/O isolation level, and a quality of service (QoS) request of the n virtual logical address streams.

19. The method of claim 14, wherein the generating of the condensed cluster mapping table further comprises:
performing an adaptive k-mean clustering algorithm;
calculating a centroid between the k physical address streams;
calculating a distance between the k physical address streams; and
generating the condensed cluster mapping table by repeatedly merging close physical address streams.

20. The method of claim 14, wherein the generating of the cache cluster mapping table further comprises exchanging a least recently used (LRU) mapping data among mapping data items stored in the cache cluster mapping table.

* * * * *